Patented May 15, 1928.

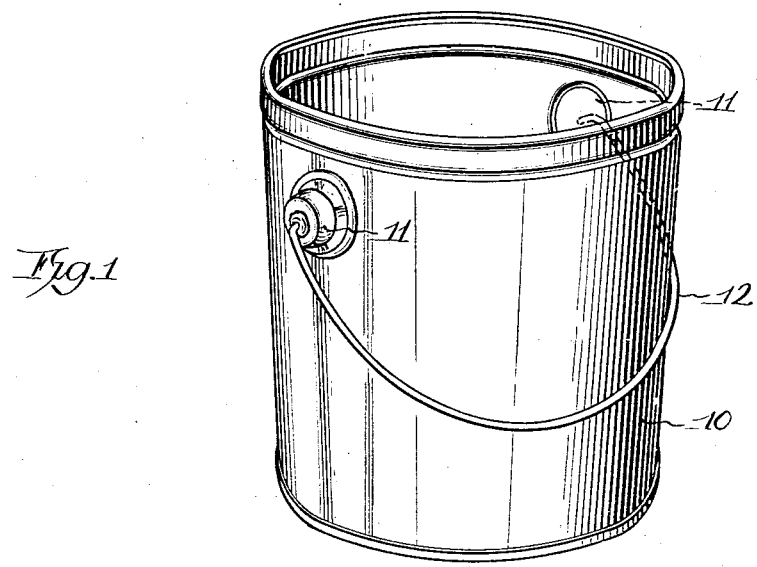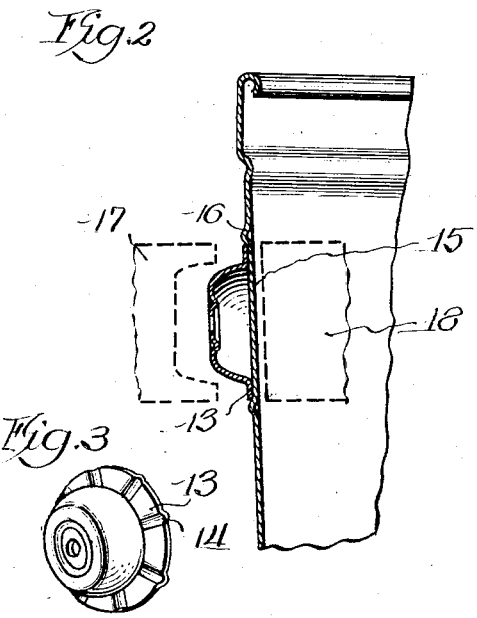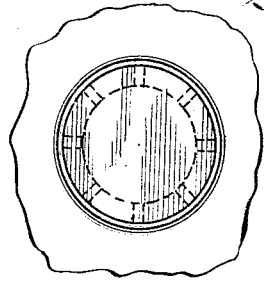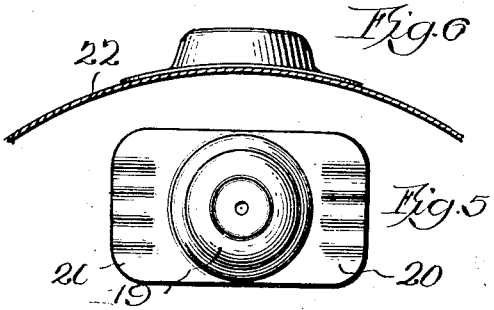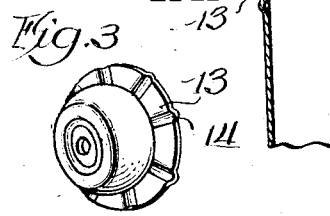

1,670,131

UNITED STATES PATENT OFFICE.

SAMUEL E. ALLERTON, OF CHICAGO, ILLINOIS.

RECEPTACLE.

Application filed August 27, 1926. Serial No. 131,867.

My invention relates to improvements in receptacles, such as lard pails or the like.

In the manufacture of pails, particularly lard pails, it has been the general practice for many years to attach the ears thereto in oppositely formed openings in the pail bodies, an inwardly extending circular flange, which is formed when the opening is punched, being pressed into folded relation with a flange on an inner disk member which closes the opening and anchors the ear in position.

It has not been practicable for various reasons to employ solder to provide against leaking, and, hence, a substantial percentage of pails as made at the present time leak at the ears.

The principal object of my invention therefore is to provide a pail and method of forming the same whereby this defect of the prior and present practice will be avoided.

In the drawings:

Figure 1 is a view of a pail having ears attached thereto, in accordance with the present invention.

Fig. 2 is a vertical sectional view through one side of my improvement.

Fig. 3 is a view of one of the improved ears in detached relation.

Fig. 4 is a view of the interior of a portion of the pail body in the region of one of the ears.

Fig. 5 is a plan view of a modified form of ear.

Fig. 6 illustrates the said modified ear attached to a pail.

In the drawings, 10 is the pail body made of comparatively thin metal as usual to which the ears 11 are attached in the manner hereinafter described. A bail 12 has its ends pivoted to the ears 11 in the conventional manner. The ears 11 are each formed of pressed sheet metal provided with a flange 13 which has ribs 14 formed therein. The metal of which said ears are formed is preferably as thin as the sheet metal of the side wall of the pail and may be somewhat lighter as shown in the drawings.

The ribs 14 are pressed in a direction away from the crown portion of the ear, the flange and ribs being so arranged that the latter will substantially, uniformly contact with the surface of the pail to which they are attached.

In the form of the invention illustrated in Fig. 1, the pail body is preferably stamped to provide two oppositely disposed plane surfaces 15, the stamping operation forming the circular ring or rib 16 of a diameter corresponding to the diameter of the flanges 13 of the ears 11. When the ears are placed in position within the rib 16, the ribs 14 only will contact with the plane surface of the pail body, as will be obvious. The ears are attached to the pail by means of electric welding. In the welding operation a pair of die points or electrodes 17 and 18 are employed, the former engaging the ear, i. e. the flange thereof, and the latter contacting with the interior of the pail body opposite the ribs 14. By means of a welding machine (not shown) current is caused to flow from one die point to the other through the interposed metal of the ears and pail body whereby the ribs and the contacting portions of the body of the pail are fused and welded, as will be understood. Any suitable number of ribs 14 may be provided, the current used being such that a weld is effected at each rib. Pressure is applied to the die points 17 and 18 concurrently with the flow of the welding current whereby the ribs 14 are flattened out and hence the superficial area of the flange 13 as a whole is contracted so that the outer surface of said flange presents a substantially smooth or flat appearance lying closely in contact with and firmly secured to the can body, as illustrated in Fig. 2.

By means of this method of attachment, it is possible to make the ear of thin metal to attach it quickly and securely to the outer surface of the pail. The method is therefore economical particularly when the pails are made in large quantities, it does not interfere with the lithographing which may be applied to the exterior surface, if desired, the ears and particularly the flanges thereof do not detract materially from the finished appearance of the article and the unreliable and wasteful construction of the prior art is avoided.

In Figs. 5 and 6, I have illustrated a modification of my improvements whereby the ear 19 can be attached to the curved outer surface of the can without first providing the flat or plane area 15, described above. In this form of the invention, the ear 19 is of stamped tin sheet or other suitable material, and is provided with flanges 20, the lower surface of the ear being shaped to conform to the outer surface of the pail or receptacle 22 to which it is attached. Ribs 23 are provided in the flanges 20, 20, as shown in Fig. 5. The ears of this form of the invention also are secured to the pail by welding, suitable die points being provided whereby the ribs 23 are caused to fuse and flatten out under the heat of the current and pressure of the dies. After the welding operation the flanges 20 lie in close contact with the pail body, as shown in Fig. 6.

By my improvements, a bail can be attached to an imperforate pail body and the ears for the bail can be attached more readily than where the former construction, referred to above, is employed.

Although I have shown and described certain features of my improvements for the purpose of illustration, it will be understood that I do not wish to be restricted specifically thereto, except as limited to the same by the appended claims.

What I claim as new is:

1. A pail having oppositely disposed plane areas formed in the body thereof and surrounded by pressed out ribs and thin metal ears having flanges welded to said areas at predetermined places only.

2. A thin sheet metal ear for a metal receptacle comprising a bail engaging portion, and a flange provided with a plurality of welding ribs pressed therefrom to contact with the surface of said receptacle and establish welding circuits therewith.

3. As a new article of manufacture, a receptacle of thin material having thin metal members secured to flat areas on the outside thereof by welding along a plurality of radial lines, the metal intermediate said lines being of contracted superficial area and in close contact with the metal wall of said receptacle, said members serving as means for the attachment of a handle or the like.

4. The combination with a pail having a side wall of thin sheet metal with a pair of ribs pressed therefrom on opposite sides of said pail and each surrounding a flat surface, of a pair of cup-shaped members also formed of equally thin sheet metal and each having a circumferential flange received within the enclosure formed by a rib and having a plurality of substantially radial ribs pressed therefrom in contact with and electrically welded to said flat surface, the metal of said ribs being pressed flat against said surface.

In testimony whereof, I have subscribed my name.

SAMUEL E. ALLERTON.